(12) United States Patent
Perelman et al.

(10) Patent No.: US 9,565,590 B2
(45) Date of Patent: Feb. 7, 2017

(54) SYSTEMS AND METHODS FOR MODEM CONTROL BASED ON FEEDBACK

(71) Applicant: QUALCOMM Incorporated, San Diego, CA (US)

(72) Inventors: Valeriya Perelman, Nesher (IL); Venkata Ramanan Venkatachalam Jayaraman, San Diego, CA (US); Rohit Kapoor, San Diego, CA (US); Rashid Ahmed Akbar Attar, San Diego, CA (US); Nela Gurevich, Yoqneam (IL); Debesh Kumar Sahu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 14/152,290

(22) Filed: Jan. 10, 2014

(65) Prior Publication Data

US 2015/0201350 A1     Jul. 16, 2015

(51) Int. Cl.

| | |
|---|---|
| *H04W 28/02* | (2009.01) |
| *H04W 28/16* | (2009.01) |
| *H04W 76/02* | (2009.01) |
| *H04L 12/801* | (2013.01) |
| *H04L 12/841* | (2013.01) |

(52) U.S. Cl.
CPC ........ *H04W 28/0289* (2013.01); *H04L 47/127* (2013.01); *H04L 47/193* (2013.01); *H04L 47/283* (2013.01); *H04W 76/02* (2013.01)

(58) Field of Classification Search
CPC . H04W 28/0289; H04W 76/02; H04L 47/127; H04L 47/193; H04L 47/283
See application file for complete search history.

(56) References Cited

U.S. PATENT DOCUMENTS

| | | | |
|---|---|---|---|
| 6,628,612 B1* | 9/2003 | Sabry | H04L 12/5695 370/230 |
| 7,287,082 B1 | 10/2007 | O'Toole, Jr. | |
| 7,735,084 B2 | 6/2010 | Nagano | |
| 2003/0099197 A1* | 5/2003 | Yokota | H04L 12/5695 370/230 |

(Continued)

FOREIGN PATENT DOCUMENTS

| | | |
|---|---|---|
| EP | 0932282 A2 | 7/1999 |
| EP | 2530889 A1 | 12/2012 |
| WO | 2011066585 A1 | 6/2011 |

OTHER PUBLICATIONS

International Search Report and Written Opinion for PCT/US2015/010806, mailed May 20, 2015, 10 pages.

(Continued)

*Primary Examiner* — Curtis A Alia

(74) *Attorney, Agent, or Firm* — Withrow & Terranova, PLLC

(57) ABSTRACT

Systems and methods for modem control based on feedback are disclosed. In one embodiment, a modem observer module is associated with software within a computing device. The modem observer receives information from the modem relating to uplink bandwidth availability and/or network conditions that may impact uplink bandwidth. Based on the uplink bandwidth availability at the modem, the modem observer may throttle or limit the number of connections that are active by the applications.

28 Claims, 6 Drawing Sheets

(56) References Cited

U.S. PATENT DOCUMENTS

| | | | |
|---|---|---|---|
| 2003/0154306 A1* | 8/2003 | Perry | H04L 29/12009 709/245 |
| 2004/0100979 A1 | 5/2004 | Mandin et al. | |
| 2004/0122952 A1 | 6/2004 | Kistler et al. | |
| 2006/0029037 A1 | 2/2006 | Chen et al. | |
| 2006/0095572 A1* | 5/2006 | Burke | H04L 67/14 709/227 |
| 2006/0199594 A1* | 9/2006 | Gundu | G10L 19/167 455/452.2 |
| 2008/0170499 A1* | 7/2008 | Cozens | H04L 12/5695 370/230.1 |
| 2009/0024991 A1* | 1/2009 | Campbell | H04L 67/06 717/173 |
| 2009/0196276 A1* | 8/2009 | Lee | H04W 72/1236 370/347 |
| 2011/0116444 A1 | 5/2011 | Relyea | |
| 2011/0158095 A1* | 6/2011 | Alexander | H04L 47/805 370/232 |
| 2012/0263036 A1 | 10/2012 | Barclay et al. | |
| 2012/0324037 A1 | 12/2012 | Ramadas | |
| 2014/0365554 A1* | 12/2014 | Bleau | H04L 67/42 709/203 |

OTHER PUBLICATIONS

Second Written Opinion for PCT/US2015/010806, mailed Dec. 4, 2015, 6 pages.
International Preliminary Report on Patentability for PCT/US2015/010806, mailed Mar. 23, 2016, 16 pages.

* cited by examiner

SYSTEMS AND METHODS FOR MODEM CONTROL BASED ON FEEDBACK

BACKGROUND

I. Field of the Disclosure

The technology of the disclosure relates generally to controlling a modem in a computing device.

II. Background

Mobile communication devices have become common in current society. The prevalence of these mobile devices is driven in part by the many functions that are now enabled on such devices. Many of these functions rely on the ability to communicate with websites on the Internet or other sources removed from the mobile device. The proliferation of functions and applications that rely on communication with remote sources is generally handled by packets that pass through the wireless transceiver (e.g., a cellular modem) of the mobile device. Most such mobile devices rely on cellular protocols to handle the transmission and receipt of such packets.

While cellular networks have increasingly robust bandwidths available to users of such mobile devices, the mobile device may still suffer delays in transmission of packets in the cellular modem of the mobile device as the various functions all submit packets for transmission concurrently.

Even if there is only one function sending packets such as a web browser, the web browser can generate a large number of packets at the cellular modem, thus contributing to the congestion at the cellular modem. That is, a browser will typically open numerous transmission control protocol (TCP) connections simultaneously, to achieve higher network utilization under good network conditions. The TCP flow-control algorithms include an acknowledgement (ACK) clocking mechanism to provide a reliable connection. However, using an ACK clocking mechanism involves sending numerous ACK packets on the uplink connection. Under good network conditions, the numerous ACK packets increase performance. However, if the network conditions are sub-optimal, the large number of ACK packets may negatively impact performance.

SUMMARY OF THE DISCLOSURE

Embodiments disclosed in the detailed description include systems and methods for modem control based on feedback. While specifically contemplated for use with cellular modems, exemplary embodiments are applicable to other computing devices that include a modem. In either case, a modem observer module is associated with software in the device. The modem observer receives information from the modem relating to uplink bandwidth availability and/or network conditions that may impact uplink bandwidth. Based on the uplink bandwidth availability at the modem, the modem observer may throttle or limit the number of connections. In a first embodiment, the number of active connections is controlled. In a second embodiment, the total number of connections is controlled (i.e., open and either active or idle).

In this regard in one embodiment, a method of controlling a mobile terminal is disclosed. The method comprises receiving an indication of a bandwidth available to a modem of the mobile terminal. The method also comprises determining a maximum number of active connections. The method also comprises determining a current number of active connections. The method also comprises receiving a request to open one or more new active connections. The method also comprises comparing the maximum number of active connections to the current number of active connections plus the request for new active connections. The method also comprises limiting a total number of active connections to no more than the maximum number of active connections.

In another embodiment, a non-transitory computer readable medium comprising software with instructions is disclosed. The software includes instructions to receive an indication of a bandwidth available to a modem of a mobile terminal. The software also includes instructions to determine a maximum number of active connections. The software also includes instructions to determine a current number of active connections. The software also includes instructions to receive a request to open one or more new active connections. The software also includes instructions to compare the maximum number of active connections to the current number of active connections plus the request for new active connections. The software also includes instructions to limit a total number of active connections to no more than the maximum number of active connections.

In another embodiment, a mobile terminal is disclosed. The mobile terminal comprises a user interface. The mobile terminal also comprises a modem. The mobile terminal also comprises a control system operatively coupled to the user interface and the modem. The control system is configured to receive an indication of a bandwidth available to the modem. The control system is also configured to determine a maximum number of active connections. The control system is also configured to determine a current number of active connections. The control system is also configured to receive a request to open one or more new active connections. The control system is also configured to compare the maximum number of active connections to the current number of active connections plus the request for new active connections. The control system is also configured to limit a total number of active connections to no more than the maximum number of active connections.

In another embodiment, a computing device is disclosed. The computing device comprises a user interface. The computing device also comprises a modem. The computing device also comprises a control system operatively coupled to the user interface and the modem. The control system is configured to receive an indication of a bandwidth available to the modem. The control system is also configured to determine a maximum number of active connections. The control system is also configured to determine a current number of active connections. The control system is also configured to receive a request to open one or more new active connections. The control system is also configured to compare the maximum number of active connections to the current number of active connections plus the request for new active connections. The control system is also configured to limit a total number of active connections to no more than the maximum number of active connections.

DETAILED DESCRIPTION

Figure 1:
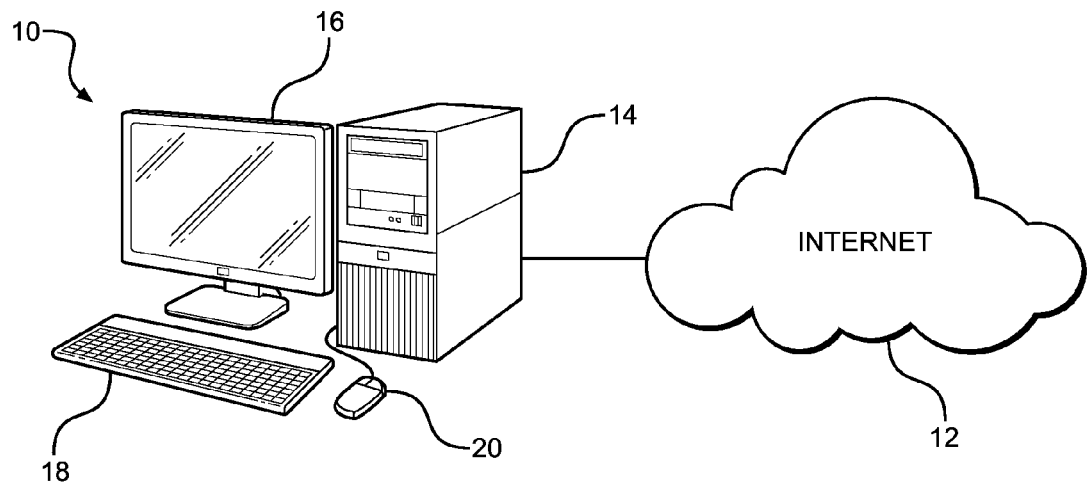
FIG. 1 is a simplified view of an exemplary computing device communicating in a network with a modem that may be controlled through a feedback mechanism.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include systems and methods for modem control based on feedback. While specifically contemplated for use with cellular modems, exemplary embodiments are applicable to other computing devices that include a modem. In either case, a modem observer module is associated with software in the device. The modem observer receives information from the modem relating to uplink bandwidth availability and/or network conditions that may impact uplink bandwidth. Based on the uplink bandwidth availability at the modem, the modem observer may throttle or limit the number of connections. In a first embodiment, the number of active connections is controlled. In a second embodiment, the total number of connections is controlled (i.e., open and either active or idle).

Embodiments disclosed herein allow the computing device (mobile or not) to evaluate the available uplink bandwidth and then determine whether or not additional connections should be made. If the uplink bandwidth is limited because of network congestion or poor signal strength, the software may preclude connections from being opened or preclude existing connections from being active. In this manner, the total number of packets sent on the uplink channel is throttled to a number below a threshold determined by the available bandwidth. Controlling the number of packets in this manner improves performance of the uplink channel because it reduces the highly variant latencies added to the packets going on the uplink. Such latencies with high variance can cause poor round trip delay time (RTT) estimation on both the client and server side. Poor RTT may cause needless retransmission of packets that were not lost, late retransmission of data that was lost in the network, and reduced downlink bandwidth because the server cannot differentiate between congested uplink and congested downlink conditions. Reduction or improvements in any of these conditions will improve overall performance.

While an exemplary embodiment of the present disclosure contemplates use in a mobile terminal such as a cellular phone using a cellular modem, the present disclosure is not so limited. In this regard, FIG. 1 illustrates a computing device 10 coupled to a network 12, which, in an exemplary embodiment, is the internet. The computing device 10 may include a housing 14 with a central processing unit (CPU, not illustrated) therein. A user may interact with the computing device 10 through a user interface formed from input/output elements such as a monitor (sometimes referred to as a display) 16, a keyboard 18, and/or a mouse 20. In some embodiments, the monitor 16 may be incorporated into the housing 14. While a keyboard 18 and mouse 20 are illustrated input devices, the monitor 16 may be a touch-screen display, which may supplement or replace the keyboard 18 and mouse 20 as an input device. Other input/output devices may also be present as is well understood in conjunction with desktop or laptop style computing devices. While not illustrated, the housing 14 may also include a modem therein. The modem may be positioned on a network interface card (NIC) as is well understood. Likewise, a router and/or an additional modem may be external to the housing 14. For example, the computing device 10 may couple to the network 12 through a router and a cable modem as is well understood. However, even where such external routers and modems are present, the computing device 10 is likely to have an internal modem to effectuate communication with such external routers and modems.

Figure 2:
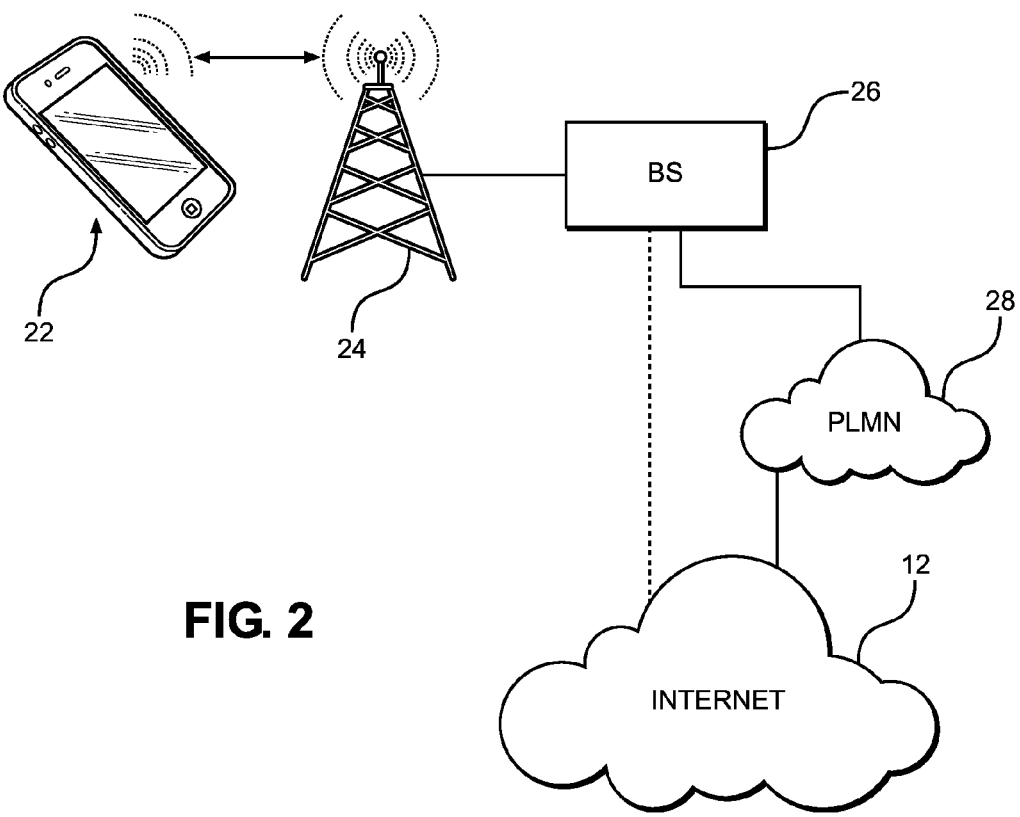
FIG. 2 is a perspective view of an exemplary mobile terminal communicating in a cellular network with a modem that may be controlled through a feedback mechanism.

In addition to computing devices 10 the exemplary embodiments of the present disclosure may also be implemented on mobile terminal. In this regard, an exemplary embodiment of a mobile terminal 22 is illustrated in FIG. 2. The mobile terminal 22 may be a smart phone such as a SAMSUNG GALAXY™ or APPLE iPHONE®. Instead of a smart phone, the mobile terminal 22 may be a cellular telephone, a tablet, a laptop, or other mobile computing device. The mobile terminal 22 may communicate with a remote antenna 24 associated with a base station (BS) 26. The BS 26 may communicate with the public land mobile network (PLMN) 28, the public switched telephone network (PSTN, not shown), or a network 12 (e.g., the internet). It is also possible that the PLMN 28 communicates with the internet (e.g., network 12) either directly or through an intervening network (e.g., the PSTN). It should be appreciated that most contemporary mobile terminals 22 allow for various types of communication with elements of network 12. For example, streaming audio, streaming video, and/or web browsing are all common functions on most contemporary mobile terminals 22. Such functions are enabled through applications stored in memory of the mobile terminal 22 and using the wireless transceiver of the mobile terminal 22.

Figure 3:
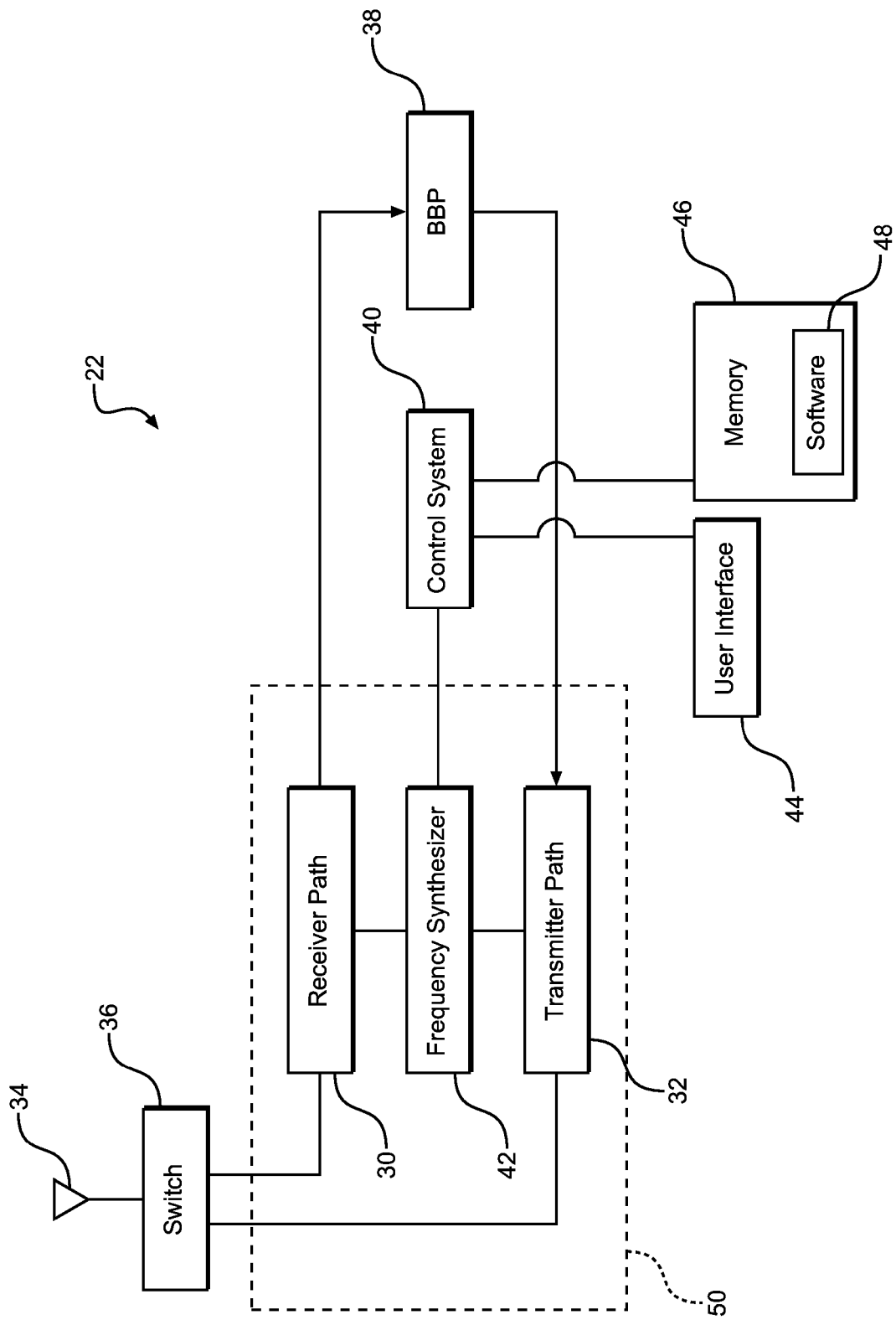
FIG. 3 is a block diagram of components of the mobile terminal of FIG. 2.

A more detailed depiction of the components of the mobile terminal 22 is provided with reference to FIG. 3. In this regard, a block diagram of some of the elements of the mobile terminal 22 is illustrated. The mobile terminal 22 may include a receiver path 30, a transmitter path 32, an antenna 34, a switch 36, a baseband processor (BBP) 38, a control system 40, a frequency synthesizer 42, a user interface 44 and memory 46 with software 48 stored therein.

The receiver path 30 receives information bearing radio frequency (RF) signals from one or more remote transmitters provided by a base station (e.g., BS 26). A low noise amplifier (not shown) amplifies the signal. A filter (not shown) minimizes broadband interference in the received signal, while down conversion and digitization circuitry (not shown) down converts the filtered, received signal to an intermediate or baseband frequency signal, which is then digitized into one or more digital streams. The receiver path 30 typically uses one or more mixing frequencies generated by the frequency synthesizer 42. The BBP 38 processes the digitized received signal to extract the information or data bits conveyed in the signal. As such, the BBP 38 is typically implemented in one or more digital signal processors (DSPs).

With continued reference to FIG. 3, on the transmit side, the BBP 38 receives digitized data, which may represent voice, data, or control information, from the control system 40, which it encodes for transmission. The encoded data is output to the transmitter path 32, where it is used by a modulator (not shown) to modulate a carrier signal at a desired transmit frequency. An RF power amplifier (not shown) amplifies the modulated carrier signal to a level appropriate for transmission, and delivers the amplified and modulated carrier signal to the antenna 34 through the switch 36. Collectively, the BBP 38, receiver path 30, transmitter path 32 and frequency synthesizer 42 may be considered a wireless modem 50. While wireless modem 50 is specifically described with relation to the RF signals associated with a cellular signal, the present disclosure is not so limited. For example, a wireless modem operating according to other wireless protocols may also benefit from inclusion of embodiments of the present disclosure. Thus, modems operating according to standards such as BLUETOOTH, the various IEEE 802.11 standards, Universal Mobile Telecommunications System (UMTS), High Speed Packet Access (HSPA), Long Term Evolution (LTE), and other wireless protocols may all use embodiments of the present disclosure.

With continued reference to FIG. 3, a user may interact with the mobile terminal 22 via the user interface 44, such as a microphone, a speaker, a keypad, and a display. Audio information encoded in the received signal is recovered by the BBP 38, and converted into an analog signal suitable for driving the speaker. The keypad and display enable the user to interact with the mobile terminal 22. For example, the keypad and display may enable the user to input numbers to be dialed, access address book information, or the like, as well as monitor call progress information. The memory 46 may have software 48 therein as noted above which may effectuate exemplary embodiments of the present disclosure.

While not illustrated, it should be appreciated that a less mobile computing device 10 may have similar elements, but instead of a wireless modem 50, the NIC may have a wirebased interface to effectuate communication.

Regardless of whether the computing device is a mobile terminal 22 or a more stationary computing device 10, exemplary embodiments of the present disclosure allow the control system (e.g., control system 40) to control congestion at the modem (e.g., modem 50) by polling the modem for uplink queue latency and selectively controlling connections made by the applications. That is, many web applications generate plural connections. When network conditions are not congested, such plural connections allow the web application to receive data on the plural connections effectively simultaneously. This near simultaneous reception results in better download efficiency. For example, a web browser may download different portions of a web page through different ones of the plural connections (e.g., text on one connection, images on another, java script on others, and so forth). However, each connection must go through a setup process which generates packets on the uplink portion of the communication link. When enough of these packets arrive at the modem in poor network conditions, packet collisions may occur, latency increases as packets stay in the modem queue waiting to be sent over the uplink, and packets may be lost. By controlling the number of active connections, exemplary embodiments improve performance. That is, as noted above, network congestion may result in latencies with high variance, which can cause poor RTT estimation on both the client and server side. Poor RTT may cause needless retransmission of packets that were not lost, late retransmission of data that was lost in the network, and reduced downlink bandwidth because the server cannot differentiate between congested uplink and congested downlink conditions. Reduction or improvements in any of these conditions by throttling the number of open, active connections will improve overall performance.

To provide control over the number of connections, exemplary embodiments use modem feedback by adding a modem observer to the software 48 of the computing device 10, 22. The modem observer polls the modem 50 to ascertain network conditions and/or available uplink bandwidth for the modem 50. If network conditions are congested and/or the available uplink bandwidth is below a predefined threshold, the modem observer instructs the network stack to limit the number of active connections. In a first embodiment, the modem observer is associated with each application (i.e., there is a separate modem observer for each web based application (e.g., browser, video streaming, audio streaming, etc.). In a second embodiment, the modem observer is in the hypertext transfer protocol (http) stack associated with all of the web based applications (i.e., there is one modem observer shared amongst all the web based applications). As is understood, an http stack for a web browser application is one of the browser modules that is responsible for managing http transactions. The http stack opens browser network connections and sends http requests to remote servers.

Figure 4:
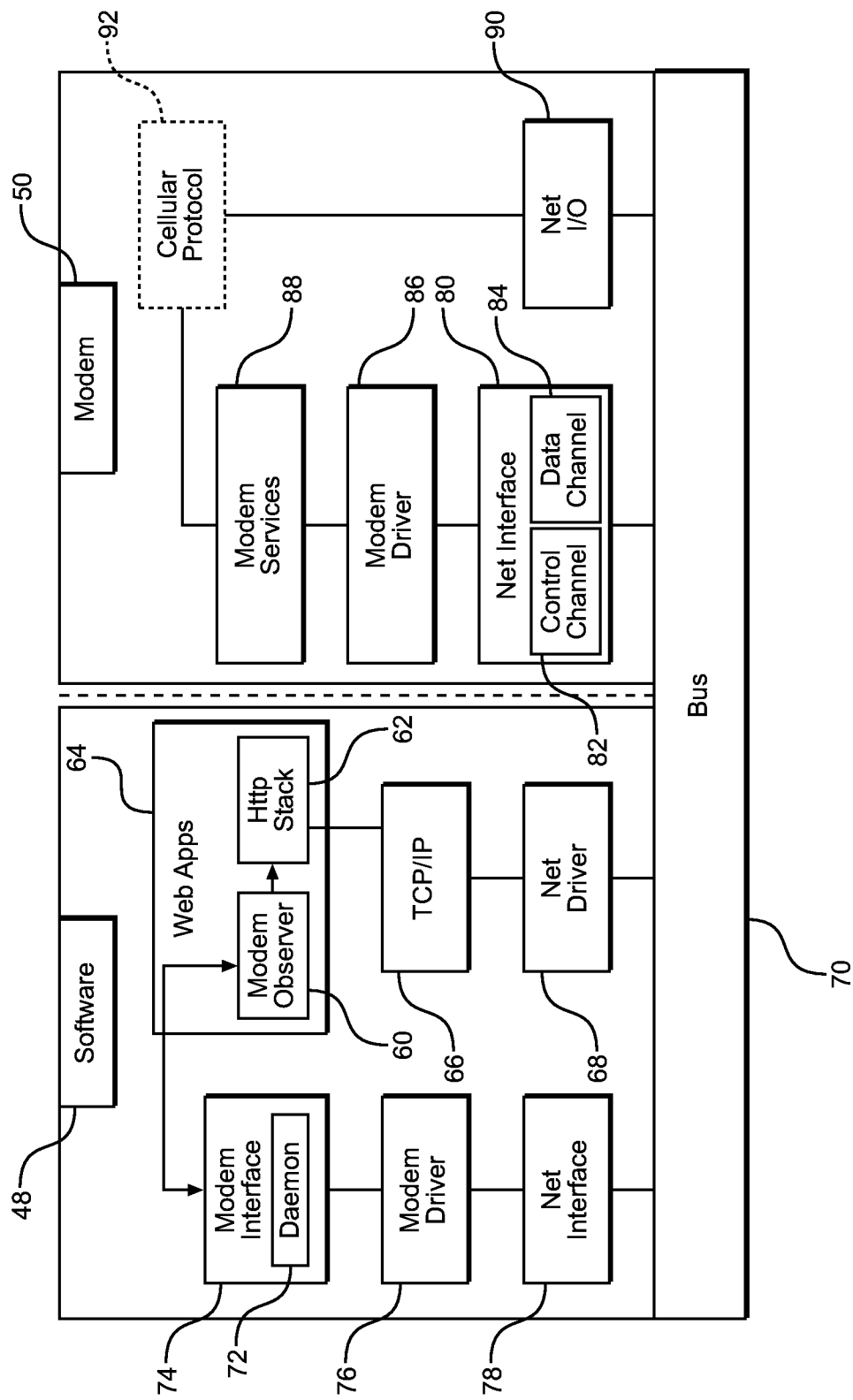
FIG. 4 is an exemplary block diagram of the software of the computing device of FIG. 1 or the mobile terminal of FIGS. 2 and 3 with a modem observer that facilitates feedback based control of the modem.

In this regard, FIG. 4 illustrates a block diagram of exemplary embodiments of software 48 with a modem observer 60 that receives feedback from the modem 50 to ascertain network congestion and control active connections routed through the modem 50. This control of active connections improves performance. As illustrated, modem observer 60 is associated with http stack 62 for all the web applications 64. However, as noted above, a separate modem observer 60 may be associated with the net stack for each application within the web applications 64. As is understood, the web applications 64 logically sit above the transmission control protocol/internet protocol (TCP/IP) stack 66. The TCP/IP stack 66 assembles packets from the web applications 64 and passes them to the net driver 68, which passes the packets to the modem 50 through a bus 70. Bus 70 may operate according to a shared memory driver (SMD), secure digital input/output (SDIO), high speed inter chip (HSIC) protocol (part of universal serial bus (USB) 2.0), or the like. The modem observer 60 communicates with a modem interface daemon 72 within the modem interface software 74. The modem interface software 74 uses the modem driver 76 to control the modem 50 through the net interface 78 and the bus 70.

With continued reference to FIG. 4, the modem 50 includes a network interface 80 with a control channel module 82 and a data channel module 84. The network interface 80 communicates with a modem driver 86, which communicates with a modem services module 88. The modem services module 88 is able to provide information about the number of packets waiting to be sent over the uplink channel as well as provide information about the bandwidth available to the modem 50 and other network conditions. Thus, when the modem interface daemon 72 polls the modem 50 for information relating to network congestion, the modem services module 88 is the software that responds with the requested information. The modem 50 further includes a network input/output 90 that receives the packets from net driver 68. The packets pass from the network input/output 90 to the cellular protocol module 92 where they are processed for transmission through the NIC or the antenna 24.

Figure 5:
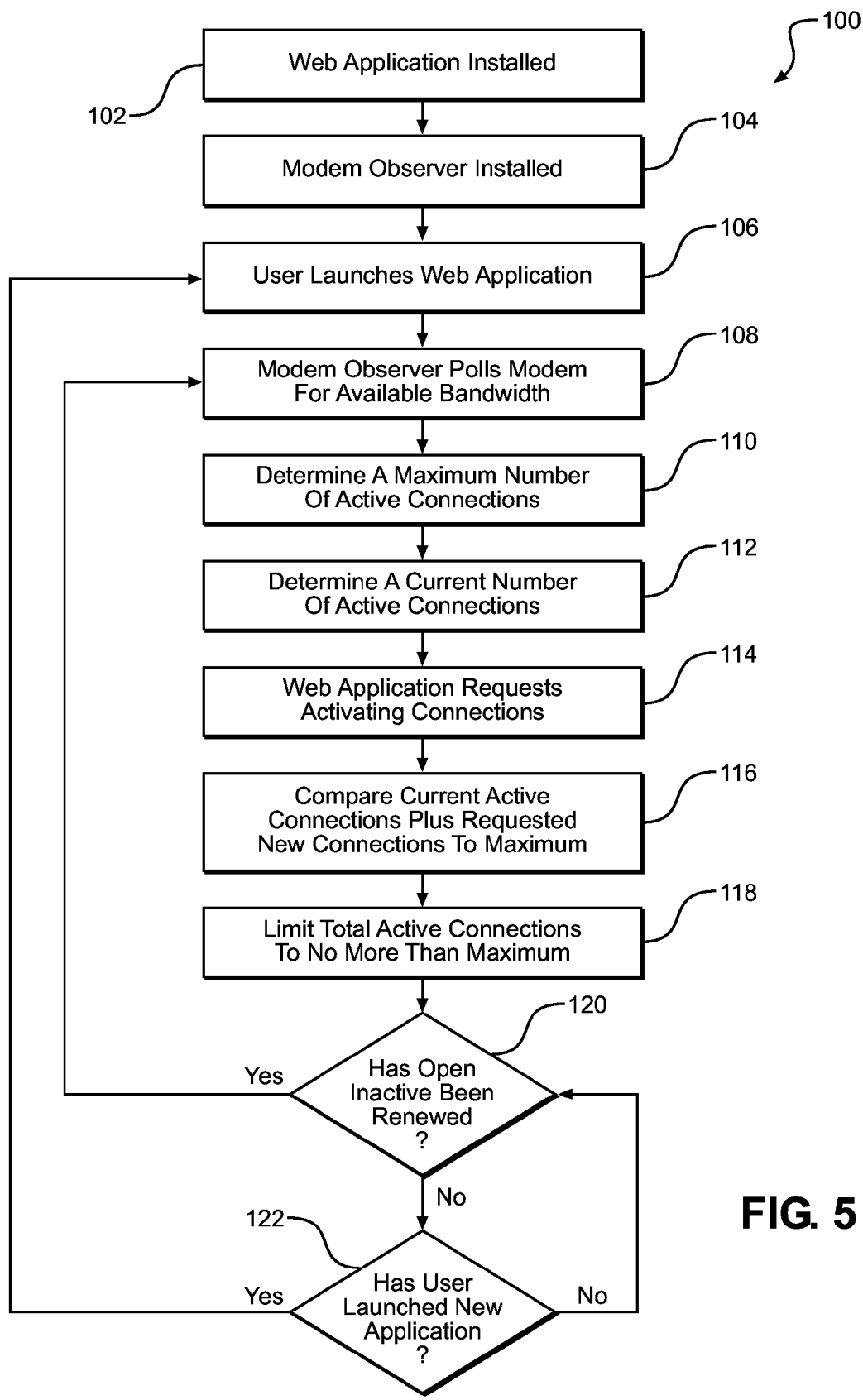
FIG. 5 is an exemplary flow chart illustrating the process of feedback based modem control.

An exemplary process of securing feedback from the modem 50 and controlling the modem thereby is provided with reference to FIG. 5. Process 100 secures information from the modem 50 and limits the number of active connections so as to improve overall performance of the system when network conditions are such that too many open and active connections would result in additional congestion at the modem 50. Accordingly, process 100 begins with the installation of web applications on the computing device 10, 22 (block 102). Installation of web applications may be done through a download process, installation through a removable medium (e.g., a disc, cd, dvd, or the like), or the software may be pre-installed during manufacture of the computing device 10, 22. A modem observer 60 is installed (block 104). As noted above, a single modem observer 60 may be installed for the http stack 62 or a multiple modem observers 60 may be installed, one for each web application. It should be appreciated that blocks 102, 104 may be done relatively contemporaneously or with much intervening time. For example, the modem observer 60 may be installed as part of an operating system upgrade or patch and the web applications may be initiated by the user at any time.

With continued reference to FIG. 5, at some point after installation, the user may use the user interface of the computing device 10, 22 to launch a web application (block 106). In an exemplary embodiment, the web application is a web browser such as GOGGLE CHROME, APPLE SAFARI, INTERNET EXPLORER, MOZILLA FIREFOX, or the like. In another exemplary embodiment, the web application may be an audio or video streaming program. Still other web applications also fall within the scope of the present disclosure as is readily understood. The modem observer 60 may, in response to the launch of the web application, poll the modem 50 for the available bandwidth for the uplink channel (block 108). In another exemplary embodiment, the modem observer 60 may poll the modem 50 periodically without specific reference to the launch of a web application. In either event, based on the available bandwidth and/or other network conditions, the control system 40 may determine a maximum number of active connections (block 110). As used herein, an active connection is a connection that is open and exchanging data with a remote location. By way of further explanation, an open connection may still be considered inactive if it is not exchanging data.

With continued reference to FIG. 5, the control system 40 may determine a current number of active connections (block 112). These active connections may be from previously opened web applications or the like. The web application requests that the http stack 62 activate one or more connections (block 114). The control system 40 compares the currently active connections plus the newly requested connections to the maximum number of connections (block 116). The control system 40 then limits the total number of active connections to no more than the maximum number of connections (block 118). Limiting the active connections may be done by failing to pass the requests to the TCP/IP stack 66 or postponing the requests.

With continued reference to FIG. 5, the control system 40 determines if an open, but inactive (i.e., not exchanging data) connection has been renewed (block 120). That is, a connection that was dormant may be reactivated by a web application such as when a user refreshes a web page or similar situation. If the answer to block 120 is yes, the process 100 moves back to block 108 where the modem observer 60 polls the modem 50 for available bandwidth. If the answer to block 120 is no, there has been no renewal of open, but inactive connections, process 100 continues with the control system 40 determining if the user has launched a new application (block 122). If the answer to block 122 is yes, the user has launched a new application; the process repeats beginning at block 106 as indicated. If the answer to block 122 is no, the user has not launched a new application, the process repeats by monitoring for renewal of open, but inactive connections (block 120).

Figure 6:
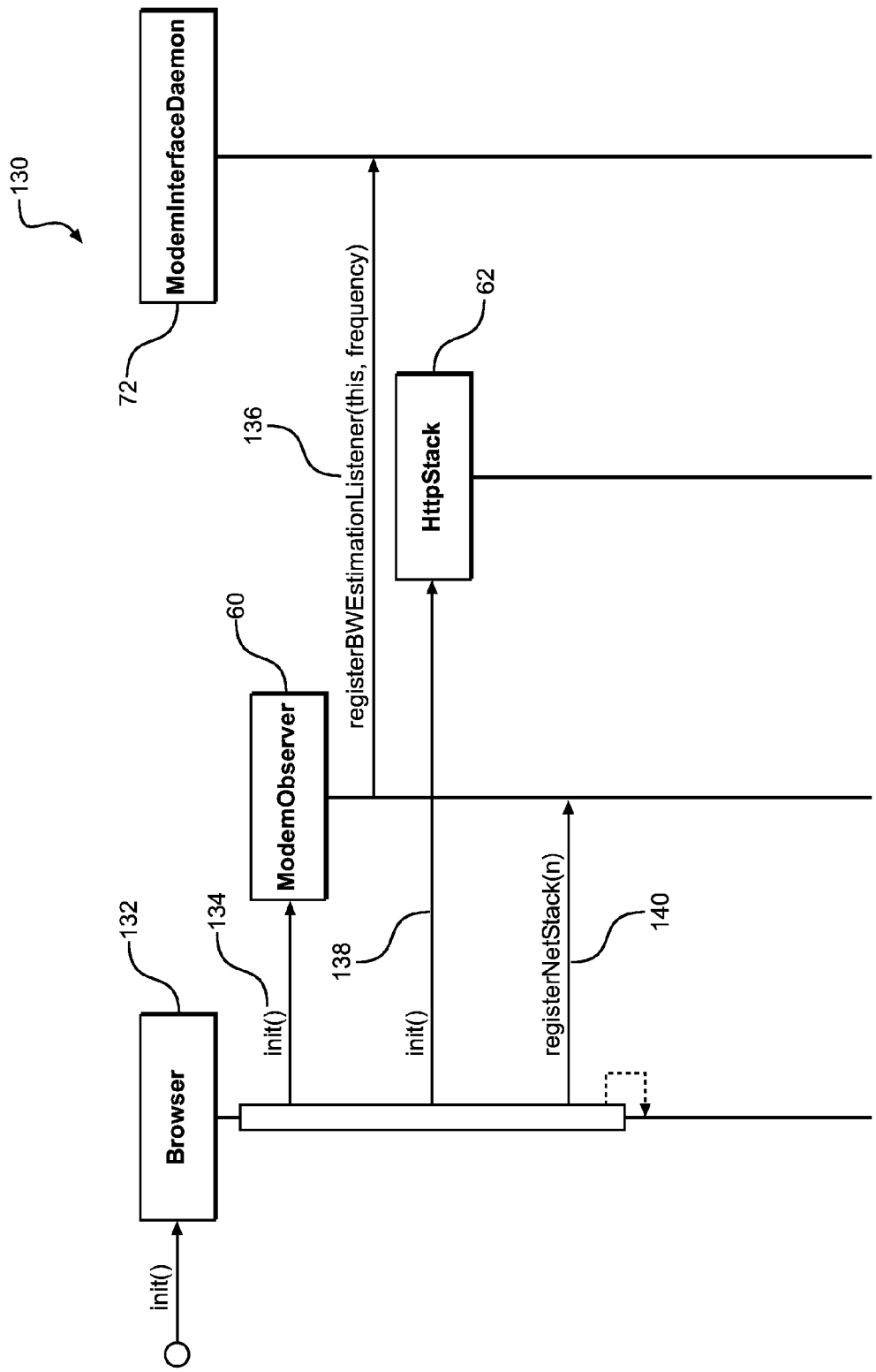
FIG. 6 is an exemplary logical flow of the initialization of the software that controls the modem based on the feedback.
Figure 7:
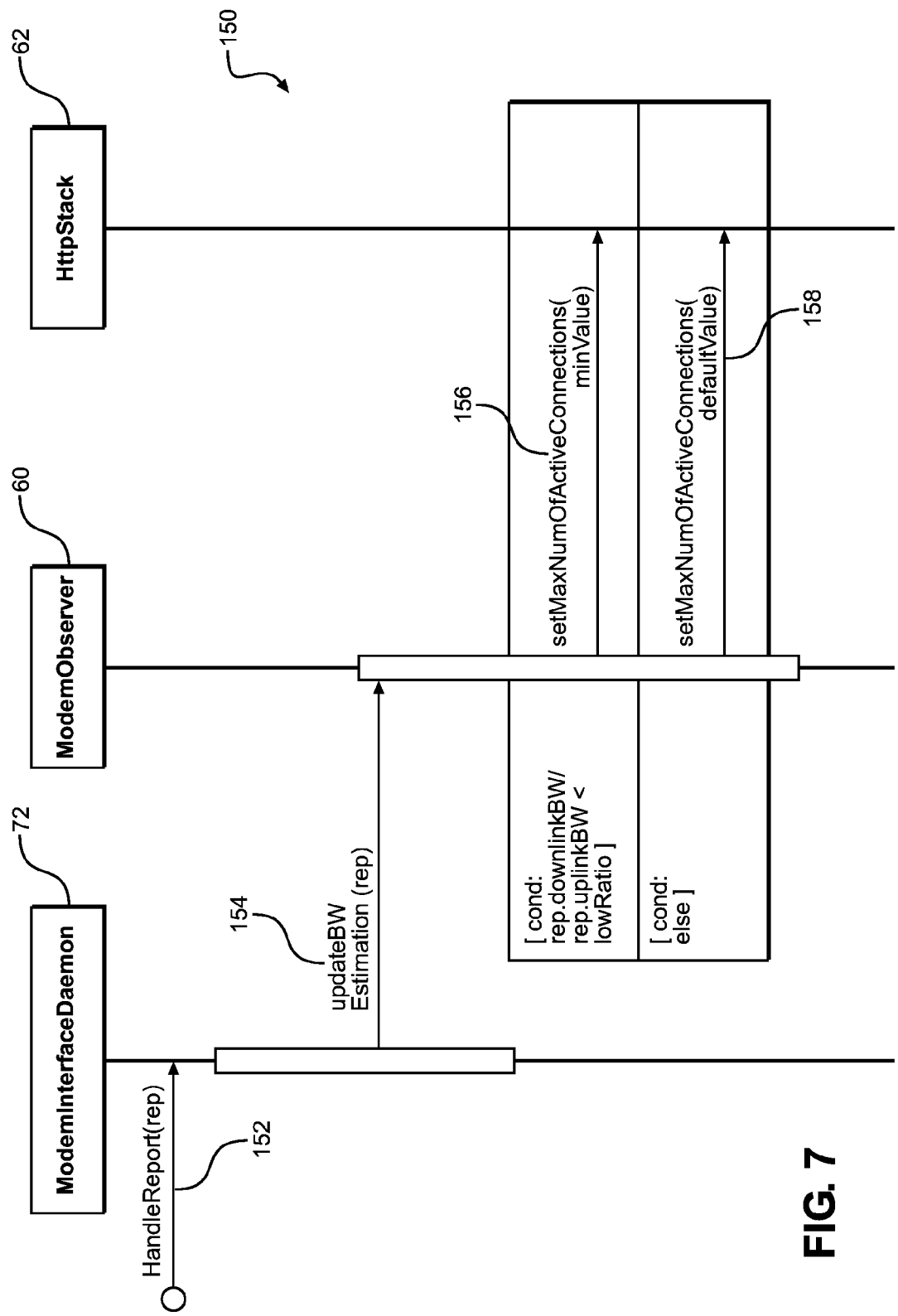
FIG. 7 is an exemplary logical flow of the feedback provided to the software used in controlling the modem.

FIGS. 6 and 7 provide logic flows for exemplary commands that may be given to implement process 100 and particularly to register web applications with the modem observer 60 so that modem feedback may be provided. In this regard, FIG. 6 illustrates a logic flow 130 where a browser 132, which is an exemplary web application 64, sends an init command 134 to the modem observer 60, which initializes the modem observer 60. Such init command 134 may be part of block 106 (FIG. 5). The modem observer 60 sends a registerBWEstimationListener command 136 to the modem interface daemon 72. This registerBWEstimationListener command 136 causes the modem observer 60 to receive reports from the modem interface daemon 72. Such reports provide information from the modem 50 indicating the bandwidth available on the uplink channel such as explained in block 108 (FIG. 5). The browser 132 also sends an init command 138 which creates the http stack 62. After the init command 138, the browser 132 further may send a registerNetStack command 140 to the modem observer 60, which provides the modem observer 60 reference to the http stack 62. By using the information from the modem interface daemon 72 relating to the available bandwidth, the modem observer 60 may dynamically change or limit the number of open, active connections in the http stack 62.

While FIG. 6 shows exemplary commands for the launch of the web applications, FIG. 7 shows exemplary commands for how the modem observer 60 handles the report from the modem interface daemon 72 in logical flow 150. The modem services module 88 (FIG. 4) sends a handlereport signal 152 to the modem interface daemon 72, which causes the modem interface daemon 72 to send an updateBWestimation signal 154 with the report as the variable therein to the modem observer 60. The modem observer 60 as part of the control system 40 sends a first signal 156 to the http stack 62 if the report indicates that the downlink bandwidth divided by the uplink bandwidth is less than a threshold ratio. The first signal sets the maximum number of active connections at a minimum value. Otherwise, the modem observer 60 sends a second signal 158 to the http stack 62 setting the maximum number of connections to a default value. Signals 156, 158 correspond to block 110 of FIG. 5.

Experimental data suggests that limiting or throttling the number of active connections does have a positive impact on performance. In this regard, an experiment was created using a test website. Specifically, the test website had 140 large images (e.g., greater than 16 kb). The upload bandwidth was set to 45 KBit/sec, the download bandwidth was set to 2500 Kbit/sec with an round trip delay time (RTT) of 60 ms. The web browsing application was the default Android browser over Agilent. This set up was run through ten iterations. The results are set forth in Table 1 below.

TABLE 1

Summary of Experiment 1

| Number of Connections | #UL-ACKS | #GET retransmits | #DL retransmits | AVG page load time in ms |
|---|---|---|---|---|
| 4 | 791 | 0 | 0 | 24174 |

TABLE 1-continued

Summary of Experiment 1

| Number of Connections | #UL-ACKS | #GET retransmits | #DL retransmits | AVG page load time in ms |
|---|---|---|---|---|
| 9 | 808 | 6.4 | 0.4 | 24496 |
| 18 | 952 | 22.8 | 11.8 | 29947 |
| 24 | 992 | 29 | 11.25 | 36154 |
| 34 | 1125 | 32 | 23.75 | 35667 |

The experiment reveals the following observations. The delay in acknowledgement (ACKs) sent over the uplink causes slower reception of the downloaded data chunks, at least when the number of connections is larger than ten. With more connections, more ACK packets are sent over the uplink. With more connections, more HTTP GET request retransmits occurs. With more connections, more packet retransmits appear on the download link. Thus, if network conditions are not optimal, large numbers of connections result in slower download times because of the lost packets and the resources spent on retransmitting lost data. Thus, clear improvements in performance may be achieved by implementing embodiments of the present disclosure which limit the number of connections in limited bandwidth conditions. Other conclusions may be summarized by noting that the reduced number of active connections based on modem feedback will have at least the following advantages. First, pressure on the modem is reduced due to reduced uplink traffic (i.e., there are fewer ACK packets sent) and reduced number of retransmissions on the uplink. Second, there are a reduced number of retransmissions on both the uplink and the downlink.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of controlling a mobile terminal comprising:
   receiving, at a control system within a mobile terminal, an indication of a bandwidth available to a modem of the mobile terminal;
   determining, at the control system, a maximum number of active connections for the modem of the mobile terminal;
   determining, at the control system, a current number of active connections at the modem of the mobile terminal;
   receiving, at the control system, from an application on the mobile terminal, a request to open one or more new active connections from the modem to a remote network;
   comparing, at the control system, the maximum number of active connections for the modem of the mobile terminal, to the current number of active connections plus the request to open the one or more new active connections; and limiting at the modem of the mobile terminal, a total number of active connections to no more than the maximum number of active connections.

2. The method of claim 1, wherein limiting the total number of active connections comprises limiting a number of open connections.

3. The method of claim 1, wherein limiting the total number of active connections comprises limiting activity on an open connection.

4. The method of claim 1, further comprising registering a modem observer with a modem interface daemon.

5. The method of claim 4, wherein receiving the indication comprises the modem observer receiving the indication from the modem interface daemon.

6. The method of claim 1, wherein receiving the request to open the one or more new active connections comprises receiving the request from a browser.

7. The method of claim 1, wherein limiting the total number of active connections comprises limiting a number of ports that may be used for active connections.

8. The method of claim 1, wherein receiving the indication of the bandwidth available to the modem of the mobile terminal comprises receiving information related to network conditions.

9. A non-transitory computer readable medium comprising software with instructions to:

receive an indication of a bandwidth available to a modem of a mobile terminal;

determine, at the mobile terminal, a maximum number of active connections;

determine, at the mobile terminal, a current number of active connections;

receive, at the mobile terminal, a request to open one or more new active connections;

compare, at the mobile terminal, the maximum number of active connections to the current number of active connections plus the request to open the one or more new active connections; and limit, from the mobile terminal, a total number of active connections to no more than the maximum number of active connections.

10. The computer readable medium of claim 9, wherein the instruction to limit the total number of active connections comprises an instruction to limit a number of open connections.

11. The computer readable medium of claim 9, wherein the instruction to limit the total number of active connections comprises an instruction to limit activity on an open connection.

12. The computer readable medium of claim 9, further comprising an instruction to register a modem observer with a modem interface daemon.

13. The computer readable medium of claim 12, wherein the instruction to receive the indication comprises an instruction causing the modem observer to receive the indication from the modem interface daemon.

14. The computer readable medium of claim 9, wherein the instruction to receive the request to open the one or more new active connections comprises an instruction to receive the request from a browser.

15. The computer readable medium of claim 9, wherein the instruction to limit the total number of active connections comprises an instruction to limit a number of ports that may be used for active connections.

16. The computer readable medium of claim 9, wherein the instruction to receive the indication of the bandwidth available to the modem of the mobile terminal comprises an instruction to receive information related to network conditions.

17. A mobile terminal comprising:

a user interface;

a modem; and a control system operatively coupled to the user interface and the modem, the control system configured to:

receive an indication of a bandwidth available to the modem;

determine a maximum number of active connections;

determine a current number of active connections;

receive a request originating at the mobile terminal to open one or more new active connections;

compare the maximum number of active connections to the current number of active connections plus the request to open the one or more new active connections; and limit a total number of active connections to no more than the maximum number of active connections.

18. The mobile terminal of claim 17, wherein the control system configured to limit the total number of active connections is configured to limit a number of open connections.

19. The mobile terminal of claim 17, wherein the control system configured to limit the total number of active connections is configured to limit activity on an open connection.

20. The mobile terminal of claim 17, wherein the control system is further configured to register a modem observer with a modem interface daemon.

21. The mobile terminal of claim 20, wherein the control system configured to receive the indication is configured to cause the modem observer to receive the indication from the modem interface daemon.

22. The mobile terminal of claim 17, wherein the control system configured to receive the request to open the one or more new active connections is configured to receive the request from a browser.

23. The mobile terminal of claim 17, wherein the control system configured to limit the total number of active connections is configured to limit a number of ports that may be used for active connections.

24. The mobile terminal of claim 17, wherein the control system configured to receive the indication of the bandwidth available to the modem is configured to receive information related to network conditions.

25. A computing device comprising:

a user interface;

a modem; and a control system operatively coupled to the user interface and the modem, the control system configured to:

receive an indication of a bandwidth available to the modem;

determine a maximum number of active connections;

determine a current number of active connections;

receive a request originating from the computing device to open one or more new active connections;

compare the maximum number of active connections to the current number of active connections plus the request to open the one or more new active connections; and limit a total number of active connections to no more than the maximum number of active connections.

26. The computing device of claim 25, wherein the control system configured to receive the indication of the bandwidth available to the modem is configured to use a modem observer to receive feedback from the modem to ascertain network congestion.

27. The computing device of claim 26, wherein the control system configured to use the modem observer is configured to use a modem observer associated with an http stack for web applications.

28. The computing device of claim 26, wherein the control system configured to use the modem observer is configured to use a plurality of modem observers, each modem observer associated with a respective net stack for each web application.

* * * * *